Aug. 30, 1966  J. R. ASWELL  3,269,824
WASTE PAPER SOIL CONDITIONING AND FERTILIZING PELLET
Filed Oct. 25, 1962
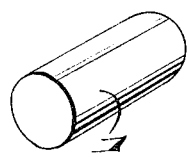
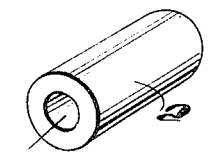
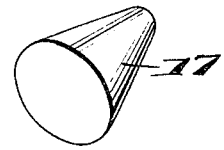
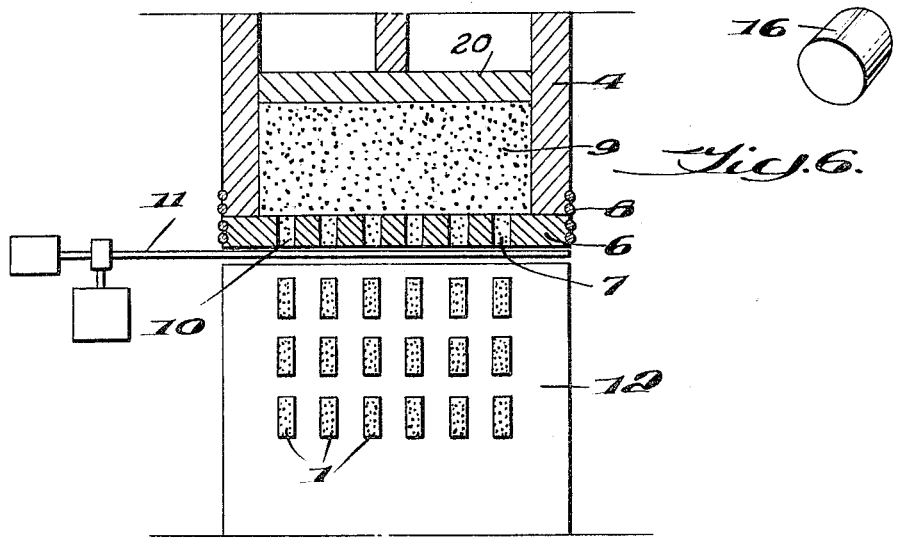
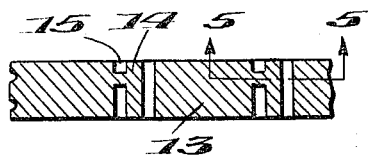
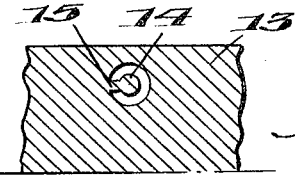
INVENTOR
JAMES R. ASWELL,
BY *Larson and Taylor*
ATTORNEYS 3,269,824
WASTE PAPER SOIL CONDITIONING AND
FERTILIZING PELLET
James R. Aswell, 59 E. Taylor Run Parkway,
Alexandria, Va.
Filed Oct. 25, 1962, Ser. No. 233,052
9 Claims. (Cl. 71—64)

This invention relates to a product for horticultural and agricultural use, and a method for making it. The invention is designed primarily for conditioning, building and maintaining exhausted or naturally deficient soil and altering soil conditions for growing of specific plants.

In its simplest form, the product is a composite made from repulped waste paper, waste paperboard, fresh wood pulp, pulped bagasse, pulped bark or other pulp cellulose. To this are added particular fertilizers, trace elements, vitamins, soil bacteria and other ingredients beneficial to the reconditioning of soil and plants.

A primary object of the invention, therefore, is to produce a soil conditioner which is simply made and easily applied.

Another objective is to provide a carrier and means for producing soils of special characteristics, and to improve both the soil and the plants and products resulting therefrom.

Yet another object resides in the provision of a soil conditioner that need be applied only once a year, which product extends its beneficial effects beyond the year of application.

Other important objects and advantages will become apparent during the course of the following description, reference being made to the accompanying drawings forming a part thereof, wherein:

FIG. 1 is a preferred form of the soil conditioner;
FIG. 2 is an alternate form;
FIG. 3 is a diagrammatic representation of a method of making the preferred embodiment;
FIG. 4 is a partial view of a die plate for making the alternate form of FIG. 2;
FIG. 5 is a section taken on line 5—5 of FIG. 4;
FIG. 6 is a third form of the conditioner; and
FIG. 7 is yet a fourth form.

Previous attempts to remedy soil deficiencies have included the treatment of soils with chemical fertilizers to obtain quick results as simply as possible. The prevalent method is to spread nitrogen, phosphate and potash fertilizer compounds on the surface and work the fertilizer into the soil. This practice has several disadvantages in that even distribution of the fertilizer is difficult to accomplish, and many parts of the soil may receive excess fertilizer which of course will "burn" roots and kill or retard plants. This latter effect, known as drenching, has the added deleterious result of mass destruction of beneficial soil bacteria, earth worms and other useful soil organisms.

Yet another serious problem arises when rain, watering or irrigation rapidly leaches out the spread fertilizer, leaving the plants with little to rely on after the first surge of growth.

The soil conditioner according to the present invention contributes to the direct nourishment of the plants; produces plant nutrients by natural processes, as in the bacterial conversion of the cellulose or other organic matter into humus; promotes better roots and sturdier plant growth; and particularly improves the composition and texture of the soil.

In another form of application, the conditioner may be used to change the characteristics of the soil in order to meet unique requirements of particular varieties of plants. Thus the soil may have available enough elements in the proper proportions to foster luxuriant, deep-hued blossoms and foliage or, in the cast of vegetables, improved nutritive qualities, taste and texture.

In one embodiment, the conditioner is in the shape of a small, solid cylindrical pellet 1, while in another, the conditioner takes the form of a small tube 2 with an inner opening 3 having a diameter about one third the outer diameter.

The carrier base of the product is readily derived from waste paper and waste paperboard, for example and may be made with equipment, most of which is presently available.

Using waste paper, for example, the waste paper is macerated and repulped by processes standard for obtaining regenerated paper. Water is then added in a normal manner in order to obtain a sufficient consistency, about 5–10% by weight of the fiber, and the mixture is pressure cooked into a slurry of finely divided cellulose fibers. The slurry may contain the residues of the glaze, resins, metallic elements, and chemicals which were used in the composition of the original paper and paperboard and in the inks and dyes with which they were printed or colored. All of these residues may be beneficial to vegetation, and a normal leaching step may therefore be eliminated.

The fertilizers, trace element and other inorganic constituents are added to the slurry and are thoroughly mixed by mechanical means. The resulting composite is then drained into a vacuum chamber where the excess moisture is drawn off until the slurry reaches the consistency of a stiff dough, or about 50–75%.

As shown in FIG. 3, slurry 9 may be packed into a metal cylinder 4 having a piston 20 and die plate 6 containing a number of holes 7 having diameters of about ⅜ inch. The die plate 6 is held to the cylinder 4 by the coil 8. The slurry 9 is extruded by the piston 20 under a sufficient pressure to result in adhering strands 10. The emerging strands 10 are then cut into pellets 1 of about ½ inch lengths by a timed rotary cutter 11. Any moisture remaining is then dried by infra-red lamps as the pellets 1 move from the extrusion step along a conveyor belt 12.

As shown in FIGS. 4 and 5, the die plate 13 may include central mandrels 14 so that the resulting pellets may have the hollow cylindrical or tube-like shape of FIG. 2.

An alternate process would include the stamping of the dough into small pellets of varied shape, for example round as in FIG. 6, conical as in FIG. 7, or rod-like shapes. These pellets should also be dried for the removal of the remaining moisture. The pellet 16 according to FIG. 6 may be stamped by compressing pellet 1 to about ⅓ to ½ its original length.

Independent of the pelletizing method used, the excess liquids and dough containing the fertilizer and remaining elements may be cycled back to the slurry for reuse.

A separate run may be necessary for the proportion of the product that contains vitamins or other materials harmed by high temperatures or chemical fertilizer concentrate. In this case the slurry is cooled to about 80 degrees F., before these additives are mixed therewith. Except for this temperature limitation in all steps, the process is identical to the above.

In the above process, it is to be noted that the thoroughly mixed ingredients are made denser by the mechanical forces used in forming the pellets.

Worked into the soil, the pellets slowly release their constituent ingredients to the soil and roots through action of moisture and soil bacteria, thereby steadily furnishing nutrients and other substances during a particular growing season and afterward, storing them in the soil for the next season.

Moisture in the soil will cause densified pellets to expand gradually to double or triple their compressed volume, and drying of the soil will cause them to contract. This action aerates and loosens the soil, and since the product weighs from ¾ to ⅔ less than the surrounding soil, it serves to lighten the soil in the dry contracted state the pellets will retain the ingredients remaining in them until the pellets are again moistened.

Additionally, the densified pellets have greater water absorption and retention qualities than do most soils. Thus the pellets provide reservoirs of moisture to sustain roots even after the surrounding soil has essentially dried. Further, the compressed pellets take smaller storage and shipping space than would be uncompressed products.

*Example*

(1) For use with stripped or filled-in soils which are highly deficient in plant essentials, the following were added to and thoroughly mixed with the slurry, on the basis of 100 pounds, dry-weight, of waste paper.

| | | |
|---|---|---|
| Nitrogen | lb | 2 |
| Phosphate | lb | 3 |
| Potash | lb | 1½ |
| Calcium (as slaked lime) | lb | 8 |
| Magnesium | gm | 2 |
| Iron | gm | 16 |
| Copper | gm | 8 |
| Manganese | mg | 100 |
| Zinc | mg | 100 |
| Cobalt | mg | 400 |
| Boron | mg | 100 |
| Aluminum | mg | 100 |
| Sulfur | mg | 100 |
| Iodine | mg | 200 |
| Molybdenum | mg | 100 |

(2) For use of the product with heavily impacted clay soil, hydrolyzed polyacrylonitrile, 8 ounces, was added to Example 1. The result provided a crumbly and porous clay.

(3) In a separate run, the following were added to the slurry and thoroughly mixed per 100 pounds dry-weight waste paper (holding temperatures to no more than 80° F.)

| | | |
|---|---|---|
| Vitamins B-1, B-2, B-6, and calcium pantothenate (in established plant formulas) | oz | 6 |
| Viable composting bacteria (commercial formula) | lb | ½ |
| Corn starch as culture medium for bacteria | lb | 3 |

In drying Example 3 pellets, 80° F. is again the highest permissible temperature.

(4) For use with organic compounds and containing no chemical fertilizers, the following were added and mixed thoroughly to the slurry containing 200 pounds dry weight of waste paper, the maximum temperature being 80° F.

| | | |
|---|---|---|
| Crystallized blackstrap molasses or other waste residue from sugar or syrup-making (all rich in minerals) | lb | 15 |
| Vitamins B-1, B-2, B-6, and calcium pantothenate (commercial formula for plants) | oz | 6 |
| Viable composting bacteria (commercial formula) | oz | 6 |
| Viable, free-moving nitrogen-fixing soil bacteria—*Clostridium pasteurianum* and *Azobacter Chroococcum* (these organisms replace the nitrogen destroyed by composting bacteria as the latter convert organic material to humus) | gm | 20 |

(5) Again, for use with organic gardens and containing no chemical fertilizer, the following were added to the slurry on the basis of each 100 pounds dry weight of waste paper.

| | | |
|---|---|---|
| Magnesium | gm | 2 |
| Iron | gm | 16 |
| Copper | gm | 16 |
| Manganese | mg | 100 |
| Zinc | mg | 100 |
| Cobalt | mg | 400 |
| Boron | mg | 200 |
| Aluminum | mg | 100 |
| Sulfur | mg | 100 |
| Sodium | mg | 100 |
| Iodine | mg | 200 |
| Molybdenum | mg | 100 |

The resulting product was quite useful for soil highly deficient in trace elements necessary for proper plant growth.

From the resulting products of the examples above, it has been determined that about 200 pounds treats 300 square feet of garden and farm soil; while less may be needed for soil less active in growing.

After soil has been plowed or spaded, the product is spread evenly on the surface, then harrowed or otherwise worked in, to a depth of four or five inches, after which seeds or slips are planted. Beyond normal surface cultivation, weeding, and watering, nothing further is required.

For lawn grass, shrubbery, trees, the product may either be spread on the surface and used as a mulch or can be lightly worked into the topsoil.

For house plants or for starting slips indoors, the product is mixed with the potting soil at proportions of one-fourth to one-fifth of the soil.

For planting fruit trees, gve pounds of the product are worked into the hole dug to receive the burlap-wrapped roots of the tree. For adult fruit trees—and shade trees—six two-foot deep holes are dug in a circle around the trunk at the "shade line" and packed with the product, then covered with a few inches of soil. (Varying formulas are indicated for specific types of trees—for example, a product very high in iron for peach and apple trees.)

In an experiment using modifications of the examples cited above, eight "Big Boy" hybrid tomato slips were planted—in heavy sand-clay soil after gravel and builder's litter had been removed by coarse screening—as follows:

(1) Two slips with the Example I with, however, the nitrogen component reduced to one-tenth that noted because too much nitrogen is harmful to tomatoes. Proportion was one part product to six parts soil.

(2) Two slips with Example 4 *minus* the culture of nitrogen-fixing bacteria, in the same product-to-soil proportion as above.

(3) Two slips in soil treated with commercial fertilizer ("Vigoro") according to directions on the package.

(4) Two slips in untreated soil.

In applications 1 and 2, there was no essential difference in the four plants. They grew rapidly, having dark green foliage and sturdy stalks, to an average height of nine or ten feet. These four plants yielded a total of 57 large, heavy tomatoes, almost entirely free of blemishes. The meat was firm and *tart*. The skins, however, were somewhat thicker than usual but they peeled readily.

In application 3 to two plants with which commercial fertilizer was used grew fairly well at first but soon displayed yellowed and brown-spotted leaves. Lower stems withered and died and the plants, which reached a height of about five feet, bore twelve tomatoes, three of which compared favorably with those reported in item 1-2, the others grading down from fair to poor in quality.

In application 4, of the two slips in untreated soil, one withered and died after a few weeks. The remaining plant grew about three feet tall, with thin, weedy stems, ragged foliage that was splotched with yellow, brown, and black, with considerable leaf curl and leaf drop. Only two of half a dozen blossoms matured into fruit. These two tomatoes grew no larger than golf balls, at which point they reddened into split-skinned fruit touched with rotten patches.

All four sets of tomato plants were watered precisely alike. Because the garden was shaded on both east and west sides, none of the plants received more than four hours of sun daily.

It is to be noted, of course, that the above represents preferred forms of the invention, and various other forms or methods may be practiced without departing from the spirit of the invention or the scope of the subjoined claims.

I claim:

1. A soil conditioning pellet consisting essentially of a carrier of repulped and compressed waste paper fiber and a predetermined mixture of soil fertilizing ingredients absorbed therein, wherein said pellet has the properties of expanding when moistened to release a portion of the said ingredients, and contracting when dry to retain the remaining ingredients, said expanding and contracting properties acting to aerate the soil.

2. The pellet according to claim 1 wherein the carrier is in the shape of a cylinder.

3. The pellet according to claim 1 wherein the carrier is in the shape of a tube having a central bore diameter about one-third the diameter of the cylinder.

4. The pellet according to claim 1 wherein the carrier is in the shape of a cone.

5. Tht pellet according to claim 1 wherein the fertilizing ingredients are selected from the group consisting of nitrogen, phosphate, potash, calcium, trace elements, hydrolyzed polyacrylonitrile, vitamins, composting bacteria and associated culture media, and sugar.

6. The pellet according to claim 5 wherein the culture media is corn starch.

7. A carrier for soil fertilizing ingredients consisting of a dry shaped body of repulped and compressed waste paper fibers, the waste paper fibers being compressed sufficiently to expand and slowly release a portion of the included soil fertilizing ingredients into surrounding soil when moistened and to contract when dry to retain the remaining ingredients; said expansion and contraction acting to aereate the soil, and said body being convertible into humus and the body being absorptive of water in the surrounding soil.

8. A carrier according to claim 7 wherein the body is in the shape of a cylinder having about a ⅜ inch diameter and a ½ inch length.

9. A carrier according to claim 7 wherein the body is in the shape of a tube having an internal diameter of about one third of its outer diameter.

References Cited by the Examiner

UNITED STATES PATENTS

| | | | |
|---|---|---|---|
| 1,882,377 | 10/1932 | Whittelsey | 47—9 |
| 1,978,102 | 10/1934 | Clapp | 71—24 |
| 2,019,824 | 11/1935 | Liehr et al. | 71—24 |
| 2,117,808 | 5/1938 | Jones | 71—64 |
| 2,143,468 | 1/1939 | Avery | 47—9 |
| 2,200,107 | 5/1940 | Weitz | 71—64 |
| 2,392,518 | 1/1946 | Barnhill | 71—64 |
| 2,498,480 | 2/1950 | Bierlich | 71—64 |
| 2,785,969 | 3/1957 | Clawson | 47—9 |
| 2,802,303 | 8/1957 | Weeks | 47—9 |
| 2,877,599 | 3/1959 | Hebestreet et al. | 71—24 |
| 3,017,720 | 1/1962 | Busch | 47—9 |
| 3,047,453 | 7/1962 | Shook | 162—100 |
| 3,111,453 | 11/1963 | Helversen | 162—100 |

OTHER REFERENCES

Youngman, W. H.: "Gardeners Learn Value of Mulch in D.C. Area," in The Sunday Star, Washington, D.C., June 3, 1956, page E–7.

S. LEON BASHORE, *Primary Examiner.*

ANTHONY SCIAMANNA, *Examiner.*

THOMAS D. KILEY, *Assistant Examiner.*